Dec. 3, 1968 K. CLARK ET AL 3,413,839

METHOD OF AND APPARATUS FOR MECHANICALLY TESTING THE QUALITY OF BONDED JOINTS

Filed Nov. 15, 1965 3 Sheets-Sheet 1

INVENTORS
KENDALL CLARK
WALTER J. SCHUELKE

BY Joseph K. Spiegel
ATTORNEY

United States Patent Office 3,413,839

Patented Dec. 3, 1968

3,413,839

METHOD OF AND APPARATUS FOR MECHANICALLY TESTING THE QUALITY OF BONDED JOINTS

Kendall Clark and Walter J. Schuelke, Poughkeepsie, N.Y., assignors to International Business Machines Corporation, Armonk, N.Y., a corporation of New York Filed Nov. 15, 1965, Ser. No. 507,848

8 Claims. (Cl. 73—37)

ABSTRACT OF THE DISCLOSURE

High pressure, high velocity jets of fluid medium are used to develop tensile, shear and compressional forces in the evaluation of the bonded joints between a microminiature chip device and the conductive land pattern on a dielectric substrate of a microminiature module.

This invention relates to a method of and apparatus for mechanically testing the quality of bonded joints, and in particular to developing tension, shear and compressional forces in evaluating a bonded joint between first and second objects, typically a microminiature chip device attached to a printed circuit board or substrate.

Many information handling systems are based upon a plurality of "building block" circuits which are conveniently interconnected to perform any desired logic function, for example, arithmetic, data storage and the like. One approach to the fabrication of such building blocks is to microminiaturize individual active and passive devices and fasten them to a miniaturized substrate. This approach, generally referred to as microminiaturized circuitry, is discussed briefly in the periodical, "Electronics" published by McGraw-Hill, Feb. 15, 1963 at pages 45–60.

In microminiaturized circuits passive devices such as resistors, and active devices or "chips" such as transistors and/or diodes are secured to substrates of the order of 0.45" x 0.45" x 0.06". The chips, as one example, which are to be secured to the substrate are of the order of .028" x .028" and interconnection of these chips to the substrate is a particular problem. For a connection or bonded joint to be rated acceptable, it must have sufficient strength to withstand normal shock and vibration associated with information handling systems. Its electrical and mechanical characteristics must not deteriorate or change under extreme humidity conditions normally associated with such systems. Additionally, the interconnection must not short circuit to the semiconductor body. The bonded joint should also have a melting point sufficiently high that it will not be affected during any soldering of the substrate to a supporting card. Finally, the bonding materials should not produce a doping action in the chip device.

One particularly satisfactory bonding technique, meeting all of the above requirements, generally referred to as the solder reflow method is described in more detail in a copending application entitled, "Method of and Apparatus for Fabricating Microminiature Functional Components," by R. D. McNutt et al., Ser. No. 300,855, filed Aug. 8, 1963, and assigned to the same assignee as the present invention, now U.S. Patent 3,292,240, issued Dec. 20, 1966. This application describes a solder reflow joint established between built-up contacts on chip devices and a solder coated circuit topology or land pattern on a substrate surface.

Despite the efficacy of the previously described bonding technique, minute dirt particles on the built-up contacts or on the solder coated circuit topology or misalignment between the chip and substrate reduce the effectivenes of the bonded joint. Adequate testing of devices is required to insure that all modules will satisfy the criteria previously indicated, for their lifetime. In the past this testing has been a visual inspection under microscope which is extremely slow, tedious, expensive and rarely definitive of the quality of the bonded joint.

In a copending application entitled "Method of and Apparatus for Mechanically and Electrically Testing Bonded Joints" of R. W. Bowers, Ser. No. 507,883 filed Nov. 15, 1965, and assigned to the same assignee as the present invention, chip-substrate bonded joints are tested by subjecting the bonded joints to an air blast while simultaneously monitoring the bonded joints electrically. Chips very weakly bound to the substrate will be blown off the substrate by the force of the high velocity, low pressure blast to which the bond is subjected. In addition, poor or intermittent connections give rise to changes in resistance when subjected to an air blast and so can be detected in an appropriate monitoring circuit.

A general object of the present invention is an apparatus for and method of mechanically testing the quality of bonded joints.

Another object is the application of shear, tension and compressional forces to a bonded joint between a microminiature chip and substrate.

Still another object is the rapid and reliable testing of bonded joints included in microcircuits.

A further object is the automatic testing of bonded joints in hybrid microcircuits.

A still further object is the simultaneous testing of the bonded joints between connection terminals attached to a chip device and to a circuit pattern formed on the surface of a substrate or printed circuit board.

These and other objects are accomplished in accordance with the present invention, one illustrative embodiment of which comprises apparatus for directing a series of microcircuits under a fan jet assembly having a plurality of downwardly extending nozzles from which high pressure, high velocity air blasts are being directed. Extending a short distance from the tip of a nozzle from which a high velocity, high pressure air blast is being directed, there exists a narrow, sharply defined, fan shaped jet of air, contained within an enveloping shockwave, in which the air is at the same pressure and traveling at the same high velocity as the air at the tip of the nozzle. By closely spacing a nozzle to the bonded joints between a chip attached to the substrate, the bonded joints are subjected to a tensile stress generated by the action of the high pressure, high velocity, jet of fluid medium directed between the chip and substrate. If the pressure is kept within certain limits, chips weakly bound to the substrate, either because of a poor chip to chip contact connection or chip contact to substrate circuit pattern connection, will be blown off the substrate. Moreover, by passing the module through the jet, each bonded joint is successively subjected to tensile, shear and compressional forces.

One feature of the present invention is apparatus for testing the bonded joint between a chip device attached to the surface of the substrate of a microminiature module including means directing a high pressure, high velocity jet of fluid medium between the chip device and the surface of the substrate to thereby blow off the chips weakly bound to the substrate.

Another feature of the present invention is apparatus of the above type wherein the bonded joint is subjected to a pressure of 300–350 lbs. per square inch.

A further feature is means for advancing the module forwardly along a longitudinal path passing through said jet to successively subject the bonded joint to tensile, shear and compressional stresses.

A still further feature is an elongated manifold extending over the path, a plurality of nozzles extending downwardly therefrom and spaced successively along the path, a high pressure, high velocity jet projecting from each nozzle and intersecting the path, each nozzle being positioned such that the jet is directed from a different quadrant toward the path, to successively subject the bonded joint to each of the jets when the module is advanced along the path.

Another feature of the present invention is means for controlling the flow of fluid medium from the source to the manifold, an elongated firing stick for supporting a plurality of modules, and means for actuating the control means to permit flow of fluid medium while the stick is beneath the manifold and for shutting off the flow when the stick is no longer beneath the manifold.

Still another feature of the present invention is advancing means including a plurality of pairs of longitudinally spaced wheels, one wheel of a respective pair being disposed on opposite sides of the longitudinal path beneath the manifold, the transverse spacing between the wheels of a respective pair being normally less than the width of a firing stick, at least one wheel of a respective pair being mounted on a pivotable shaft to permit its transverse movement, control means including a solenoid operated valve and actuating means including an electrical circuit comprising the solenoid of the valve, power supply means and a normally open microswitch having an actuating plunger closely spaced to the pivotable shaft of at least one wheel and contacted upon pivotal motion to close the circuit, energize the solenoid and permit flow of fluid medium.

A further feature is a method of testing the bonded joint between a chip device attached to the surface of a substrate of a microminiature module including the step of subjecting the bonded joint to a tensile force generated by the action of a high pressure, high velocity jet of fluid medium directed between chip and substrate to thereby blow off chips weakly bound to the substrate.

A still further feature is the additional step of carrying the module forwardly along a longitudinal path passing through the jet to successively subject the bonded joint to tensile, shear and compressional stresses.

The foregoing and other objects, features and advantages of the invention will be apparent from the followning more particular description of the preferred embodiments of the invention and illustrated in the accompanying drawings.

Figure 1:
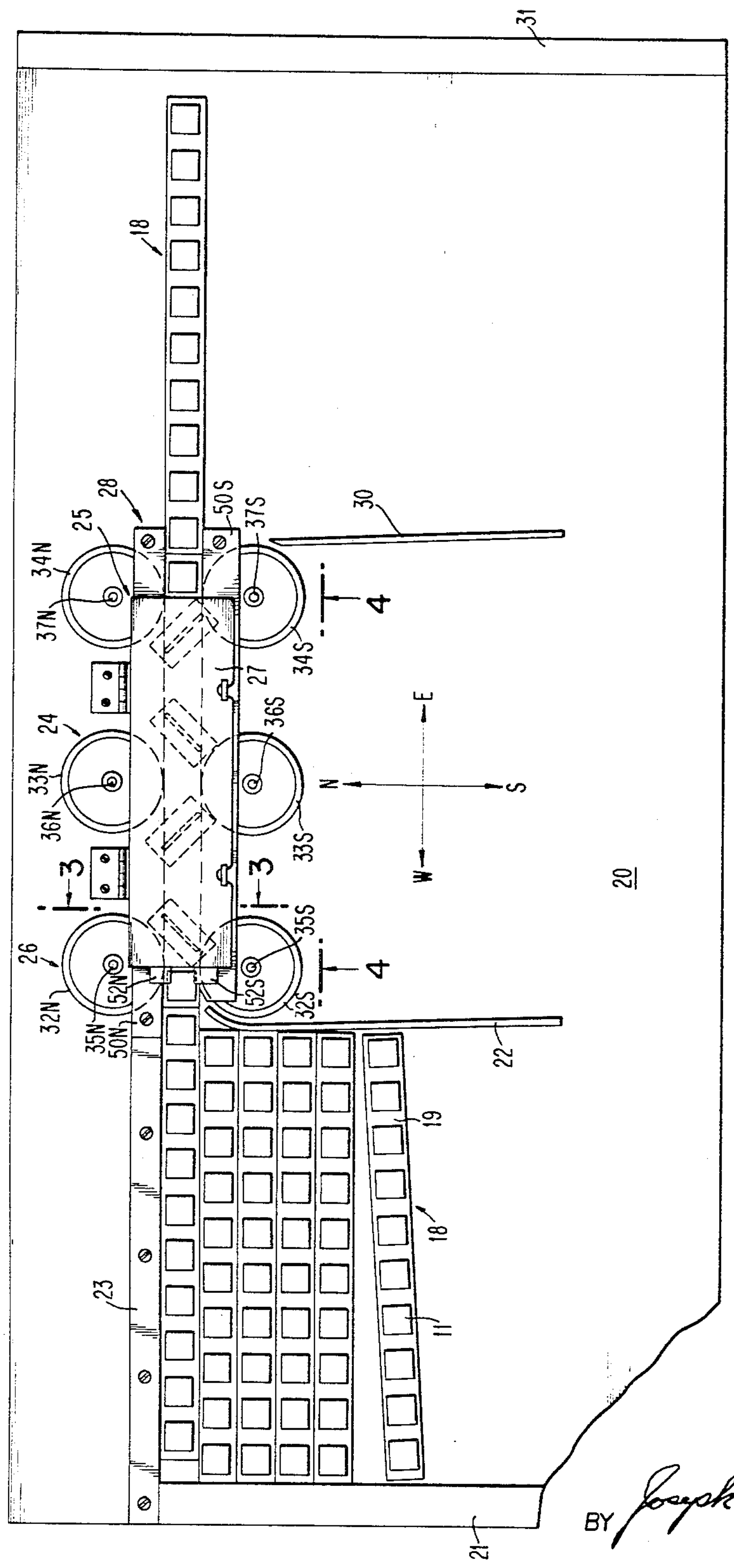
FIGURE 1 is a top plan view partially broken away of the novel bond tester of the present invention.
Figure 1B:
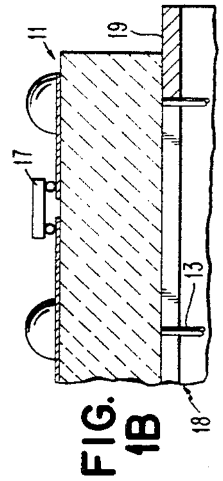
FIGURE 1B is an enlarged sectional elevational view partially broken away showing a microminiature module supported in a firing stick.
Figure 1A:
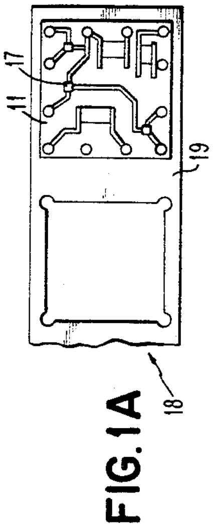
FIGURE 1A is an enlarged, plan view partially broken away showing a microminiature module supported in a firing stick.

Referring now to FIGURE 1 of the drawings, one illustrative embodiment of the bond tester 10 is shown in connection with the testing of microminiature functional components or modules 11.

Each module 11 includes a substrate 12 having extending contact pins 13. The substrate 12 is a good thermal conductor and has excellent thermal properties. One material found to satisfy these criteria is a composition of 95% alumina which is pressed or otherwise formed into a suitable geometric configuration, typically a 0.45" square. A conductive pattern 14 of unique topology is printed on the substrate surface 15 and subsequently tinned with solder. The pattern 14 may represent any particular circuit configuration and is joined to two or more contact pins 13 to provide electrical contact from active and passive devices on the substrate 12 to utilization apparatus (not shown). Thereafter, the raised contacts 16, typically spherical, of one or more chip devices 17 are bonded, for example, by solder reflow technique to the pattern 14 on the substrate surface 15.

*General operation and description*

Referring to FIGURE 1, a plurality of modules 11 to be tested is supported in an individual, longitudinally extending channel or firing stick 18. The stick 18 is a unitary, elongated structure having a top plate 19 provided with a plurality of openings. A module 11 is placed, pins down, over each opening, the engagement of the pins by the sidewalls of the opening serving to limit horizontal and lateral motions of the module 11. Each stick 18 supports ten modules.

A plurality of sticks 18 is fed by an operator along base plate 20 of tester apparatus 10 between guide rails 21, 22 until the front of the first stick 18 reaches a rear wall 23 secured to base plate 20 of the tester 10, disposing the firing stick 18 opposite the input to the bond tester region 24 where the bonded joints are to be tested.

Briefly, the bond tester region 24 includes a fan jet assembly 25 hingedly secured to base plate 20 from which high pressure, high velocity air blasts are directed and a means 26 for advancing the sticks along a test path 27 going from West to East and passing beneath the fan jet assembly 25. As the modules 11 mounted on the firing sticks 18 pass beneath the fan jet assembly each bonded joint is mechanically tested by subjecting it to high pressure, high velocity air blast action. Means 28 are also provided for guiding the modules along the test path 27 and circuit means 29 (FIGURE 7) for actuating the fan jet assembly 25 when modules 11 are beneath the fan jet assembly 25 and for shutting the fan jet assembly 25 off when modules 11 are no longer beneath the assembly 25.

Space is provided at the output of the tester region 24 between a second pair of guide rails 30, 31 for receiving sticks 18 that have been run through the test region 24.

*Advancing means*

Referring to FIGURE 1, the firing sticks 18 are fed sequentially under the fan jet assembly 25 (to be described in more detail hereafter) by the advancing means 26 which includes three pairs of motor driven rubber tired wheels 32N, 32S, 33N, 33S and 34N and 34S longitudinally spaced along the test path 27 with the wheels of a respective pair lying on opposite sides of the test path 27. Each wheel is mounted on a separate shaft passing through the base plate 20. The S shafts 35S, 36S and 37S are stationary while N shafts 35N, 36N and 37N are horizontally pivotable about an East-West axis to permit North-South separation of the wheels of a respective pair. The initial spacing between the rubber tired wheels of a respective pair is less than the width of the firing stick 18. As the firing sticks 18 are fed by an operator between the first pair of wheels 32N, 32S, each of the N wheels 32N, 33N, 34N moves away from its S counterpart 32S, 33S and 34S, transversely of test path 27, to permit engagement of the firing sticks by the wheels and passage therebetween. A typical feed rate is five (5) feet per second.

Figure 2:
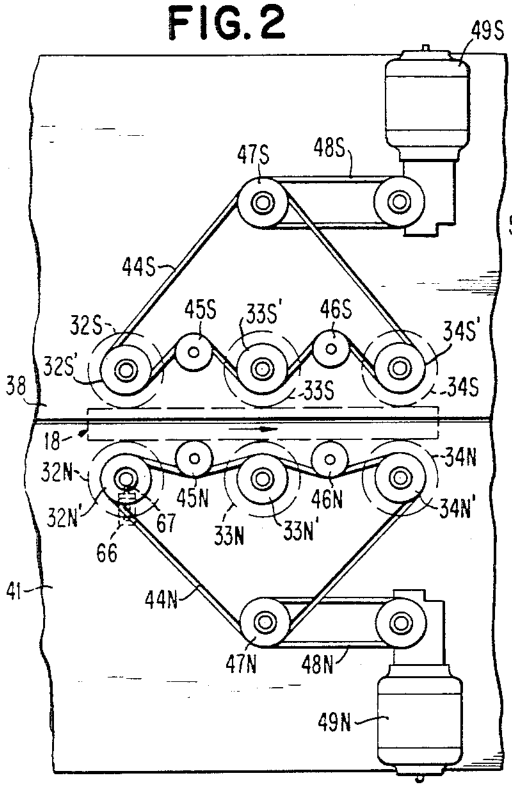
FIGURE 2 is a partially broken away bottom view of the gear train assembly beneath the bond tester base plate.
Figure 3:
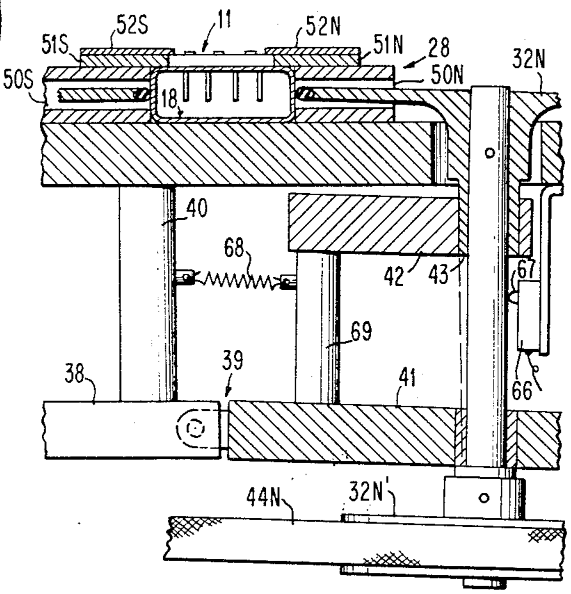
FIGURE 3 is a sectional side view taken along the lines 3—3 of FIGURE 1 in the direction of the arrows.

FIGURE 2 shows the gear train assembly driving the rubber tired wheels. The S shafts extend through the stationary portion 38 of a subplate 39 affixed to base plate 20 by a post 40 (FIGURE 3). The N shafts extend through a pivotal portion 41 of subplate 39 secured pivotally to portion 38 (FIGURE 3) and about N shafts by brackets 42 holding bearing boxes 43.

On each of the same S and N shafts but below the subplate 39 are mounted drivewheels. A first belt 44S engages drivewheels 32S', 33S' and 34S', rollers 45S and 46S and capstan 47S. A second belt 48S also engages capstan 47S and a variable speed motor 49S. The capstan 47S is driven by the motor 49S, to move the drivewheels 32S', 33S' and 34S', the rubber tired wheels 32S, 33S and 34S and thus the firing sticks 18. A similar motive mechanism is provided from the variable speed motor 49N to the wheels 32N, 33N and 34N on the opposite side of the test path 27.

*Guide means*

Referring in particular to FIGURE 3 locating guide means 28 secured to the base plate 20 on opposite sides of the test path 27 comprises a plurality of longitudinally extending pieces including: firing stick guide walls 50N, 50S; substrate guide walls 51N, 51S which also serve as firing stick capture guides, secured to firing stick guide walls 50N, 50S respectively, and overlapping the firing sticks 18; and substrate capture guides 52N, 52S secured to the substrate guide walls 51N, 51S and overlapping the substrate 12. The locating guides serve to properly position the modules and hold them in place when subjected to an air blast as they are carried on firing sticks 18 beneath fan jet assembly 25.

*Fan jet assembly*

Figure 4:
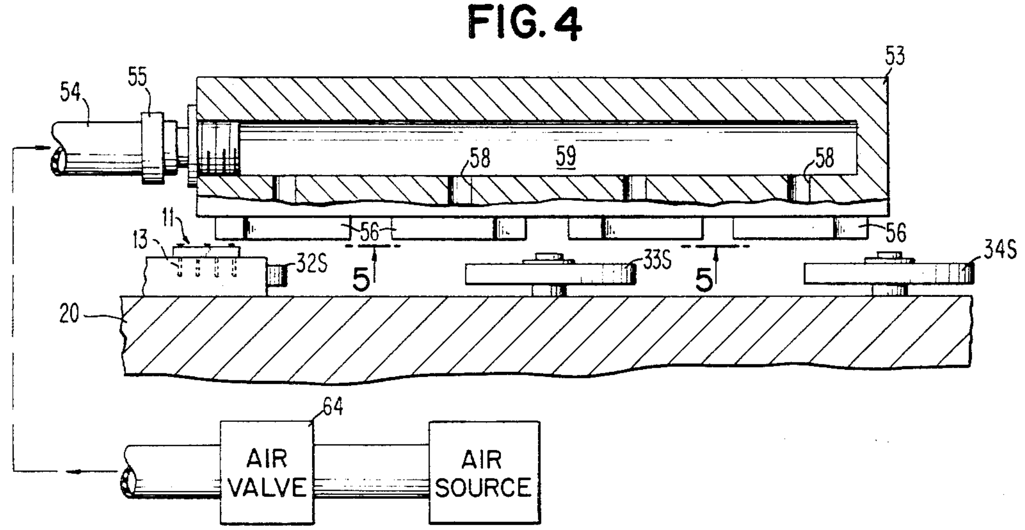
FIGURE 4 is a fragmentary sectional side view taken along the lines 4—4 of FIGURE 1 in the direction of the arrows.

Referring to FIGURE 4, the fan jet assembly 25 for subjecting the bonded joints under test to high pressure, high velocity air blast action includes a longitudinally extending manifold 53 positioned above the test path 27. Air under pressure (when the term air is used it is deemed to include any suitable fluid medium) is supplied through tubing 54 connected to manifold coupling 55 from a valveable, high pressure air source.

Figure 5:
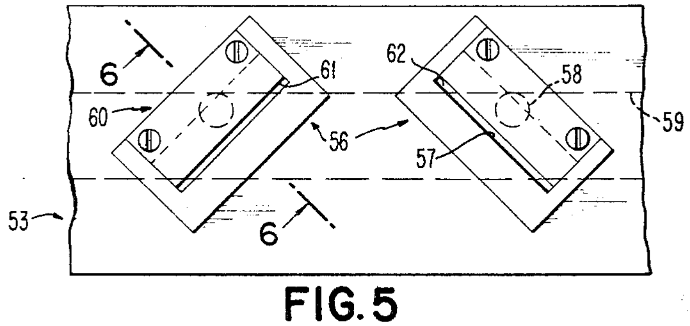
FIGURE 5 is a bottom view of the underside of a portion of the fan jet assembly taken along the lines 5—5 of FIGURE 4 in the direction of the arrows.
Figure 6:
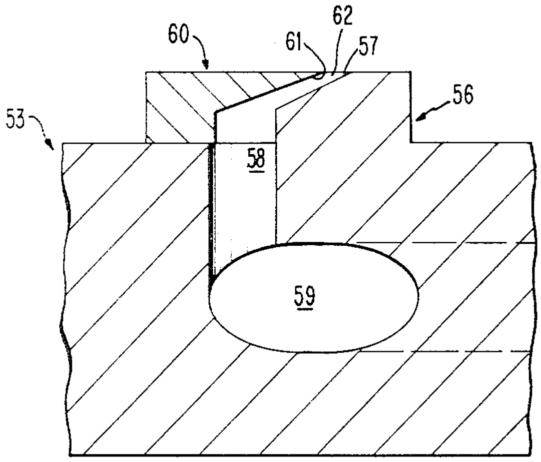
FIGURE 6 is a partial sectional side view of a fan jet nozzle taken along the lines 6—6 of FIGURE 5 in the direction of the arrows.

As best seen in FIGURES 5 and 6, reference numeral 56 indicates a downwardly extending projection having a beveled corner 57 slopping toward the horizontal at an acute angle of approximately 25° with the horizontal. A vertical discharge slot 58 extends from the bore 59 of manifold 53. An adjustable discharge plate 60 secured to manifold 53 having a side 61 slanted approximately 20° to the horizontal, forms with corner 57 the neck of a high velocity nozzle 62 with converging sidewalls 57, 61. There are four such nozzles longitudinally spaced along test path 27.

*Fan jet assembly actuation*

Figure 7:
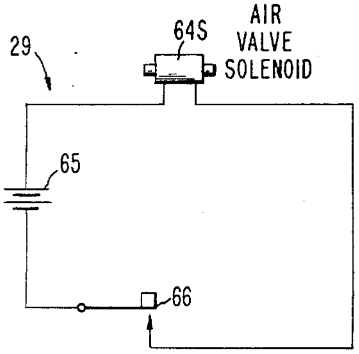
FIGURE 7 is an electrical schematic representation of the fan jet assembly actuating circuit.

Referring to FIGURE 7 the fan jet actuating circuit 29 includes the solenoid 64S of air valve 64 (FIGURE 4), a power supply 65 and normally open microswitch 66. Actuation of microswitch 66 results in energization of solenoid 64S and permits air flow.

Referring back to FIGURE 3, microswitch 66 is secured to base plate 20 and has its plunger 67 closely spaced to the shaft 35N. When a firing stick 18 is fed between the initial pair of wheels 32N, 32S, the pivoting action of shaft 35N causes it to bear against plunger 67 to energize the solenoid valve and permit air flow. As long as any portion of the firing stick is beneath the fan jet assembly 25 the air valve 64 is energized. When the end of the firing stick passes between the final pair of wheels 34N, 34S, plunger 67 is released to deenergize solenoid 64S and open circuit 29. The pivotal shafts are urged back to their original position by the spring 68 connected between posts 40 and 69.

*Testing operation*

Figure 8A:
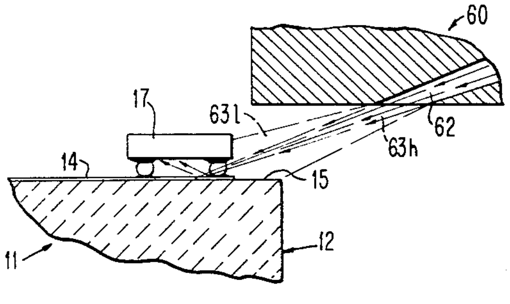
FIGURES 8A, B and C are progressive side views of chip-substrate bonded joints under test.
Figure 8B:
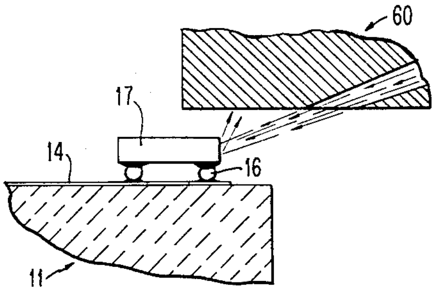
Figure 8C:
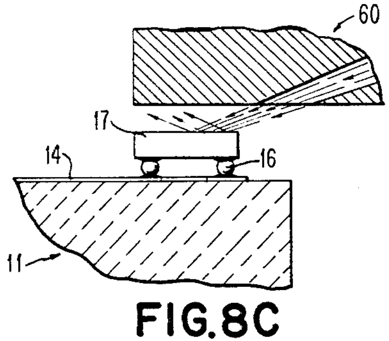

When a firing stick 18 is positioned beneath the fan jet assembly 25, each module is successively subjected to high velocity, high pressure air blast action. FIGURE 8 are progressive views of a module 11 passing beneath one nozzle 62 in manifold 53. As noted above, a narrow, sharply defined, fan shaped jet of air contained within an enveloping shockwave extends a short distance from the tip of a nozzle from which a high velocity, high pressure blast is directed. In FIGURE 8 reference numeral **63*h*** designates this *high* pressure, high velocity jet while 631 refers to the surrounding high velocity, *low* ambient pressure blast of air. Each nozzle 62 is so positioned that when a module 11 is advanced beneath the tip of nozzle 62, typically 0.005" wide and 0.875" long, the nozzle is closely spaced (0.030") to the surface 15 of substrate 12 and directs its blast of air at an acute angle to the plane of the surface 15 of substrate 12, typically 22½°. The air jet **63*h* strikes each module 11 at many times the speed of sound in free air and with a force of 300–350 pounds per square inch. In FIGURE 8A, the jet 53*h* strikes the surface 15 of substrate 12 and reflects therefrom to strike the base of chip device 17 with nearly the same force, thereby subjecting the bonded joints to tensile stress generated by the action of the high pressure, high velocity jet directed between the chip and the substrate. If the bonded joints between substrate 12 and chip 17 either at chip 17 to chip contact 16 connection or chip contact 16 to substrate circuit pattern 14 connection are of poor quality, the force of the jet 63*h* will blow the chip off the substrate. If the pressure of the jet 63*h*** is below the range just mentioned, it is insufficient to blow clear defectively bonded chips, while above this range even good bonded joints may be destroyed.

The module is then advanced to a position (FIGURE 8B) at which the jet **63*h* strikes the side of the chip device. Finally, the module 11 is further advanced to a position (FIGURE 8C) at which the jet 63*h* strikes the top of the chip device 17. Thus, each bonded joint has successively been subjected to tensile (FIGURE 8A) shear (FIGURE 8B) and compressional (FIGURE 8C) forces. There are four nozzles (FIGURE 1) directing air jets successively from the Southwest, Northwest, Northeast and Southeast. Thus, each bonded joint is subjected to twelve different reliability tests during its continuous passage beneath the fan jet assembly 25**.

While the invention has been particularly shown and described with reference to the preferred embodiments thereof, it will be understood by those skilled in the art that various changes in form and detail may be made therein without departing from the spirit and scope of the invention.

What is claimed is:

1. Apparatus for testing a joint bonding, a microminiature chip device to the surface of a substrate of a microminiature module comprising:

means for supporting said module;

means for subjecting the joint to a high pressure, high velocity jet of fluid medium, said module being positioned such that said jet is directed at an acuate angle to the plane of the surface of the substrate to thereby blow off chips weakly bound to the substrate.

2. Apparatus according to claim 1 wherein the pressure to which the joint is subjected is approximately 300–350 pounds per square inch.

3. Apparatus according to claim 7 wherein said jet means includes an elongated manifold extending over the path, a plurality of nozzles extending downwardly therefrom and spaced successively along the longitudinal path, a high pressure, high velocity jet of fluid medium projecting from each nozzle and intersecting the path, each nozzle being positioned such that said jet from each nozzle is directed from a different quadrant toward the path, said joint being successively subjected to each of said jets when said module is advanced along the path.

4. Apparatus according to claim 3 including a fluid medium source, conduit means for supplying fluid medium from said source to said manifold, means for controlling the flow of fluid medium from said source to said manifold, an elongated firing stick for supporting a plurality of said modules, said stick being carried forward by said advancing means and means operated by the movement of said stick for actuating said control means to permit flow of fluid medium while said stick is beneath said manifold and for shutting off said flow when said stick is no longer beneath said manifold.

5. Apparatus according to claim 4 wherein said advancing means includes a plurality of pairs of longitudinally spaced wheels, one wheel of a respective pair being disposed on opposite sides of the longitudinal path beneath said manifold, the transverse spacing between the wheels of a respective pair being normally less than the width of said firing stick, at least one wheel of a respective pair being mounted on a pivotable shaft to permit transverse movement of said at least one wheel, said control means comprising a solenoid operated valve, said actuating means comprising an electrical circuit including the solenoid of said valve, power supply means and a normally open microswitch having an actuating plunger closely spaced to the pivotable shaft of said at least one wheel and contacted upon pivotal motion of said shaft to close said circuit energize said solenoid and permit flow of fluid medium.

6. The method of testing the bonded joints between a microminiature chip device and its contacts and between its contacts and a substrate circuit pattern bonded to a substrate surface of a microminiature module which includes the steps of:

supporting said module; and subjecting the module so supported to a high pressure, high velocity jet of fluid medium within an enveloping shockwace directed at an acute angle to the plane of the surface of said substrate, to thereby blow off chips weakly bound to the substrate.

7. Apparatus for testing a joint bonding a microminiature chip device to the surface of a substrate of a microminiature module comprising:

(a) means for subjecting the joint to a high pressure, high velocity jet of fluid medium directed at an acute angle to the plane of the surface of the substrate; and (b) means for passing the module through said jet along a longitudinal path, said acute angle having a component along the path, thereby to subject the joint to at least one of successive tensile, shear and compressional forces, produced by the action of said jet.

8. The method of testing the joints bonding a microminiature chip device to the surface of a substrate of a microminiature module which includes the steps of:

(a) subjecting the joint to a high pressure, high velocity jet of fluid medium directed to an acute angle to the plane of the surface of the substrate; and (b) passing the module through said jet along a longitudinal path, said acute angle having a component along the path, thereby to subject the joint to at least one of successive tensile, shear and compressional forces, produced by the action of said jet.

References Cited

UNITED STATES PATENTS 2,687,152 8/1954 Hansel ---------------- 144—208

S. CLEMENT SWISHER, *Acting Primary Examiner.*

W. A. HENRY II, *Assistant Examiner.*